(12) United States Patent
Niu

(10) Patent No.: US 11,914,059 B2
(45) Date of Patent: Feb. 27, 2024

(54) ENHANCED FINGERPRINT POSITIONING

(71) Applicant: Nokia Technologies Oy, Espoo (FI)

(72) Inventor: Lei Niu, McKinney, TX (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/257,115

(22) PCT Filed: Dec. 15, 2020

(86) PCT No.: PCT/CN2020/136513
§ 371 (c)(1),
(2) Date: Jun. 13, 2023

(87) PCT Pub. No.: WO2022/126373
PCT Pub. Date: Jun. 23, 2022

(65) Prior Publication Data
US 2023/0400546 A1    Dec. 14, 2023

(51) Int. Cl.
*G01S 5/02*  (2010.01)

(52) U.S. Cl.
CPC ........ *G01S 5/0218* (2020.05); *G01S 5/02524* (2020.05)

(58) Field of Classification Search
CPC ........................... G01S 5/0218; G01S 5/02524
See application file for complete search history.

(56) References Cited

U.S. PATENT DOCUMENTS 10,440,678 B2 * 10/2019 Hedley ................. G01S 5/0294
2020/0292318 A1    9/2020 Nurminen et al.

FOREIGN PATENT DOCUMENTS

CN    102333372 A    1/2012
CN    107831468 A    3/2018
(Continued)

OTHER PUBLICATIONS

Alfakih et al., "Gaussian Mixture Modeling for Indoor Positioning WIFI Systems", 3rd International Conference on Control, Engineering & Information Technology (CEIT), May 25-27, 2015, 5 pages.
(Continued)

*Primary Examiner* — Kabir A Timory
(74) *Attorney, Agent, or Firm* — Nokia Technologies Oy

(57) ABSTRACT

Embodiments of the present disclosure relate to fingerprint positioning in a wireless communication network. A method for establishing a positioning model comprises: obtaining, at a first device, a set of training data comprising historical measurements and historical regions, a historical measurement being associated with a second device, the second device being within one of the historical regions when the historical measurement is obtained; and training the positioning model by using the historical measurements as input of the positioning model and the historical regions as output of the positioning model to obtain parameter sets of Gaussian distributions of the positioning model, the Gaussian distributions indicating probabilities that a third device is positioned in the historical regions, and the parameter sets corresponding to respective non-light of sight levels of the historical regions. In this way, the positioning accuracy of fingerprint positioning method can be greatly improved.

22 Claims, 5 Drawing Sheets

(56) References Cited

FOREIGN PATENT DOCUMENTS

| | | |
|---|---|---|
| CN | 109348416 A | 2/2019 |
| CN | 105044662 B | 3/2019 |

OTHER PUBLICATIONS

Akram et al., "CEnsLoc: Infrastructure-Less Indoor Localization Methodology Using GMM Clustering-Based Classification Ensembles", Mobile Information Systems, Hindawi, vol. 2018, 2018, pp. 1-11.

Raitoharju et al., "Gaussian Mixture Models for Signal Mapping and Positioning", Elsevier, Signal Processing, Oct. 7, 2019, pp. 1-32.

"IEEE 802.11", Wikipedia, Retrieved on Oct. 20, 2020, Webpage archive available at: http://web.archive.org/web/20201006161335/ https://en.wikipedia.org/wiki/IEEE_802.11.

International Search Report and Written Opinion received for corresponding Patent Cooperation Treaty Application No. PCT/CN2020/136513, dated Sep. 15, 2021, 9 pages.

Wei et al., "GMM-based localization algorithm under NLOS conditions", Journal on Communications, vol. 35, No. 1, Jan. 2014, pp. 99-106.

Tsalolikhin et al., "A Single-Base-Station Localization Approach Using a Statistical Model of the NLOS Propagation Conditions in Urban Terrain", IEEE Transactions on Vehicular Technology, vol. 60, No. 3, Mar. 2011, pp. 1124-1137.

Mohammadmoradi et al., "UWB-Based Single-Anchor Indoor Localization Using Reflected Multipath Components", International Conference on Computing, Networking and Communications (ICNC), Feb. 18-21, 2019, pp. 308-312.

Zhao et al., "An Accurate Fingerprinting Localization Algorithm Based on Common Beacons", Journal of Computer Research and Development, vol. 49, No. 2, 2012, pp. 243-252.

\* cited by examiner

ENHANCED FINGERPRINT POSITIONING

RELATED APPLICATION

This application claims priority to PCT Application No. PCT/CN2020/136513, filed on Dec. 15, 2020, which is incorporated herein by reference in its entirety.

FIELD

Embodiments of the present disclosure generally relate to the field of telecommunication and in particular, to methods, devices, apparatuses, and computer readable storage media for fingerprint positioning.

BACKGROUND

Fingerprint-based approaches have been widely used for indoor and outdoor positioning in wireless networks. The Pattern Matching (PTM) scheme is a typical example of the fingerprint-based approaches, and includes two phases, that is, a training phase and a positioning phase. During the training phase, a device using the PTM collects measurements from a group of bins which are served by a plurality of base station, and each of the bins is, for example, a 50 m*50 m square. The measurements may include, for example, DL-based and UL-based Time Difference of Arrival (TDOA), DL-based Angle of Departure (AoD), UL-based Angle of Arrival (AoA), multi-Round-Trip time (Multi-RTT), and Ground Truth (GT) associated with a UE. The PTM trains a single Gaussian distribution with the signal measurements. Then, during the prediction phase, with an input of measurements from a UE, the Gaussian distribution provides a respective probability that the UE locates within each of the bins. Finally, the device may choose a bin giving the highest probability and output its centroid position as a predicted location of the UE.

In practical application, None Light of Sight (NLOS) multipath reflections cause a bias in the ToA and RSRP measurements, leading to an inaccurate prediction result. Accordingly, there is a demand for an enhanced fingerprint positioning technique to provide a high positioning accuracy.

SUMMARY

In general, example embodiments of the present disclosure provide methods, devices, apparatuses, and computer readable storage media for fingerprint positioning.

In a first aspect, there is provided a method for establishing a positioning model. The method comprises: obtaining, at a first device, a set of training data comprising historical measurements and historical regions, a historical measurement being associated with a second device, the second device being within one of the historical regions when the historical measurement is obtained; and training the positioning model by using the historical measurements as input of the positioning model and the historical regions as output of the positioning model to obtain parameter sets of Gaussian distributions of the positioning model, the Gaussian distributions indicating probabilities that a third device is positioned in the historical regions, and the parameter sets corresponding to respective non-light of sight levels of the historical regions.

In a second aspect, there is provided a positioning method. The method comprises: obtaining, at a fourth device, at least one measurement of a signal associated with a third device; and applying the at least one measurement in the positioning model according to the first aspect to obtain a target region for positioning the third device.

In a third aspect, there is provided a first device. The first device comprises at least one processor and at least one memory including computer program code. The at least one memory and the computer program code configured to, with the at least one processor, cause the first device to: obtain a set of training data comprising historical measurements and historical regions, a historical measurement being associated with a second device, the second device being within one of the historical regions when the historical measurement is obtained; and train the positioning model by using the historical measurements as input of the positioning model and the historical regions as output of the positioning model to obtain parameter sets of Gaussian distributions of the positioning model, the Gaussian distributions indicating probabilities that a third device is positioned in the historical regions, and the parameter sets corresponding to respective non-light of sight levels of the historical regions.

In a fourth aspect, there is provided a fourth device. The fourth device comprises at least one processor and at least one memory including computer program code. The at least one memory and the computer program code configured to, with the at least one processor, cause the fourth device to: obtaining at least one measurement of a signal associated with a third device; and applying the at least one measurement in the positioning model according to the first aspect to obtain a target region for positioning the third device.

In a fifth aspect, there is provided a first apparatus. The first apparatus comprises: means for obtaining a set of training data comprising historical measurements and historical regions, a historical measurement being associated with a second apparatus, the second apparatus being within one of the historical regions when the historical measurement is obtained; and means for training the positioning model by using the historical measurements as input of the positioning model and the historical regions as output of the positioning model to obtain parameter sets of Gaussian distributions of the positioning model, the Gaussian distributions indicating probabilities that a third apparatus is positioned in the historical regions, and the parameter sets corresponding to respective non-light of sight levels of the historical regions.

In a sixth aspect, there is provided a fourth apparatus. The fourth apparatus comprises: means for obtaining at least one measurement of a signal associated with a third apparatus; and means for applying the at least one measurement in the positioning model according to the first aspect to obtain a target region for positioning the third apparatus.

In a seventh aspect, there is provided a non-transitory computer readable medium comprising program instructions for causing an apparatus to perform the method according to the above first aspect.

In an eighth aspect, there is provided a non-transitory computer readable medium comprising program instructions for causing an apparatus to perform the method according to the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
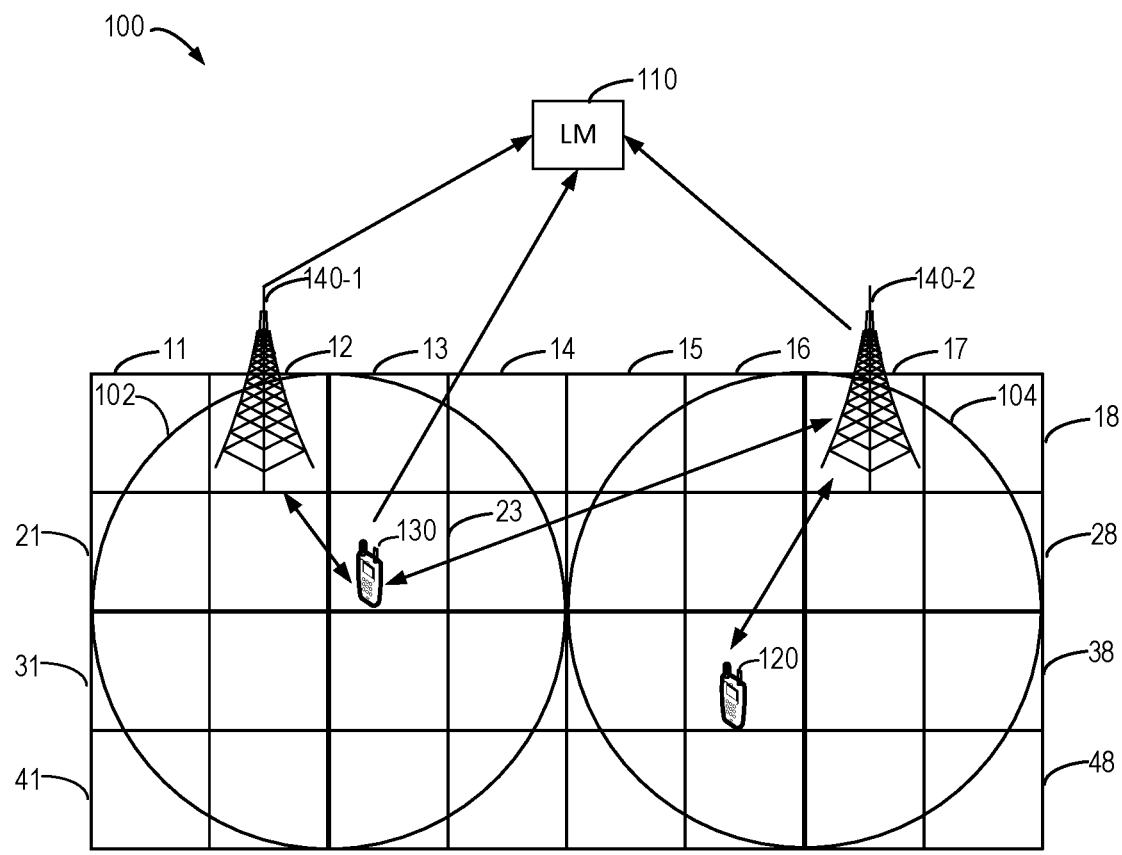
FIG. 1 illustrates an example communication environment in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs. References in the present disclosure to "one embodiment," "some example embodiments," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with some example embodiments, it is submitted that it is within the knowledge of one skilled in the art to affect such feature, structure, or characteristic in connection with other embodiments whether or not explicitly described.

It shall be understood that although the terms "first", "second", "third", "fourth", and etc. may be used herein to describe various elements, these elements should not be limited by these terms. These terms are only used to distinguish one element from another.

For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Raido (NR), Long Term Evolution (LTE), LTE-Advanced (LTE-A), Wideband Code Division Multiple Access (WCDMA), High-Speed Packet Access (HSPA), Non-terrestrial network (NTN), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems, including but not limited to a terrestrial communication system, a non-terrestrial communication system or a combination thereof. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

The conventional GMM approach models the probability of each of the bins with a single Gaussian distribution. With observation on field data, the inventor has noticed that for a bin of a small size, sometimes a variance of a trained Gaussian distribution corresponding to the bin is large that gives a "fat" distribution, however ideally a "thin" Gaussian distribution is expected in order to provide accurate probability for measurement. As discussed above, this is due to a fact that the RSRP and ToA measurements in a NLOS scenario are quite different from they are in a LOS scenario, even sometimes their GT are close. Without taking a NLOS level of each bin into consideration, the GMM-based positioning scheme provides a restricted positioning accuracy.

In order to solve the above and other potential problems, embodiments of the present disclosure provide a solution for training the GMM with an adaptive number of clusters. The adaptive number of clusters is determined based on a NLOS level of each bin. By means of the trained GMM, the positioning accuracy of fingerprint positioning technologies can be improved.

Principle and embodiments of the present disclosure will be described in detail below with reference to the accompanying drawings. Reference is first made to FIG. 1, which illustrates an example communication environment 100 in which embodiments of the present disclosure may be implemented.

As shown in FIG. 1, the communication environment 100, which may be a part of a communication network, includes a location management (LM) device 110, a second device 120, a third device 130, and network devices 140-1 and 140-2, which may be collectively referred to as the network device 140. Although the second device 120 and the third device are respectively shown as a UE, and the network devices 140-1 and 140-2 are shown as base stations, it is to be understood that embodiments of the present disclosure are also applicable to any other suitable implementations.

The LM device 110 may be, for example, a location server or any other device implementing a location management function. In the context of the present disclosure, the LM device 110 may also refer to a first device for establishing a positioning model, or a fourth device configured with the trained positioning model. The LM device 110 may collect measurements from the second device 120, the third device 130 and the network device 140. Based on the measurements received from the second device 120, the third device 130 and/or the network device 140, the LM device 110 may determine locations of the second and third devices 120 and 130 within a group of candidate regions 11 to 48, which may be also referred to as a group of bins. For each candidate region, a reference location in which may be regarded as a possible location of the second device 120 and the third device 130, for example, a centroid position of a candidate region.

The second device 120 and the third device 130 may communicate with the network devices 140-1 and 140-2 via DL and UL channels. For example, the second device 120 may receive and measure respective reference signals from the network devices 140-1 and 140-2. The second device 120 may then transmit the measurements to the LM device 110 for positioning. In the context of the present disclosure, the second device 120 acts as the terminal device that provides the training data for training the positioning model, and the third device 130 acts as the terminal device to be positioned by using the trained positioning model.

The historical measurements associated with the terminal device may be used for training the positioning model implemented in the LM device 110, which will be discussed in details below. The measurements may include, but not limited to, TOA, AoD, AoA, Multi-RTT, the reference signal received powers (RSRP), the reference signal receiving qualities (RSRQ), the received signal strength indicator (RSSI), the signal to noise ratios (SNR) and so on.

The network device 140-1 provides a cell 102, and the network device 140-2 provides a cell 104. As shown, coverage of the cells 102 corresponds to the candidate regions 11 to 44, and coverage of the cell 104 corresponds to the candidate region 15 to 48. The network device 140 may measure signals transmitted from the second device 120 and the third device 130. Additionally or alternatively, the network device 140 may collect measurements of signals from the second device 120 and the third device 130.

It is to be understood that the communication network 100 may include any suitable number of network devices and/or terminal devices as well as additional elements not shown adapted for implementations of the present disclosure, without suggesting any limitation as to the scope of the present disclosure.

Communications in the communication network 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
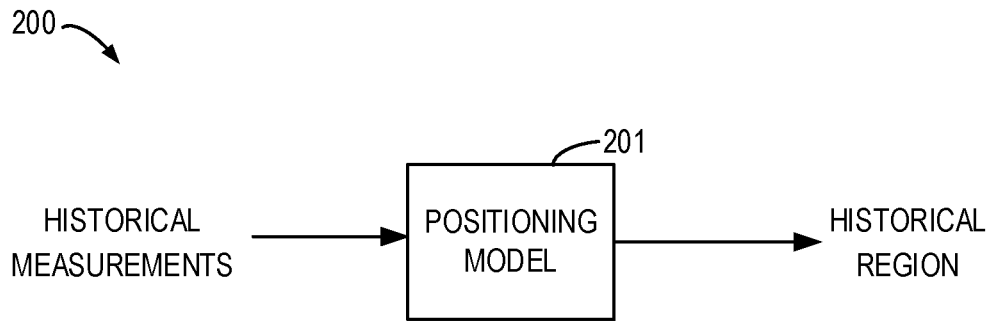
FIG. 2 illustrates a schematic diagram of an example positioning model for fingerprint positioning according to some example embodiments of the present disclosure.

Reference is now made to FIG. 2, which illustrates a schematic diagram of an example positioning model 201 for fingerprint positioning according to some example embodiments of the present disclosure. The positioning model 201 may be a GMM trained on a fourth device (not shown). In the example embodiments, the fourth device may be the LM device 110 or a separate device from the LM device 110. The trained positioning model 201 may be deployed on a network device at the core network or radio access network (RAN), for example, the LM device 110 as shown in FIG. 1. For the purpose of discussion, the positioning model 201 will be described with reference to FIG. 1.

It should be understood that the GMM is given as an illustrative example of the positioning model, and implementations of the embodiments are not limited to this. Any other probability models are also suitable for the implementations of the embodiments.

During a training phase, the LM device 110 trains the positioning model 201 with a set of training data. The training data may be real historical data obtained from terminal devices and the network devices 140-1 and 140-2, including historical measurements and historical regions. For example, the historical measurements may be associated with the second device 120, and the second device 120 is within one of the historical regions when the historical measurements are obtained. In the embodiments, the regions 11 to 48 may be referred to as the historical regions during the training phase, and as the candidate regions during the positioning phase. The historical measurements may include measurements of ToA and RSRP collected from each of the regions 11 to 48, and the historical regions may be indicated by the ground truth and/or region indices of the historical regions.

In some example embodiments, the positioning model 201 is trained by using the historical measurements as input of the positioning model 201 and the historical regions as output of the positioning model 201 to obtain parameter sets of Gaussian distributions of the positioning model. The Gaussian distributions may indicate probabilities that the third device 130 is positioned in the historical regions, and the parameter sets correspond to respective NLOS levels of the historical regions. The trained positioning model 201 includes a plurality of Gaussian distributions each corresponding to a pair of a candidate region in the group of the candidate regions 11 to 48 and the network device 140.

For a pair of a candidate region m and the network device 140, denoted by b, a corresponding Gaussian distribution $p_m(\theta_b)$ includes k Gaussian components with a weight $w_{k,b}$, a mean $\mu_{k,b}$ and a variance $\sigma_{k,b}^2$. The number k of the Gaussian components and the weight $w_{k,b}$, the mean $\mu_{k,b}$ and the variance $\sigma_{k,b}^2$ may be determined based on bisection clustering algorisms, which will be discussed in details below.

During a positioning phase, with an input of measurements associated with the second device 120, the LM device 110 may generate a probability that the second device 120 is located in each of the candidate regions 11 to 48 by using the positioning model 201. The LM device 110 may then determine the candidate region with a highest probability to be a target region, and output the reference location as a predicted location of the second device 120.

It should be understood that the training phase and the positioning phase of the DMM may be implemented at different devices. In other words, the training of the DMM may be implemented at a device rather than the LM device 110. The scope of the present disclosure is not limited in this aspect.

Figure 3:
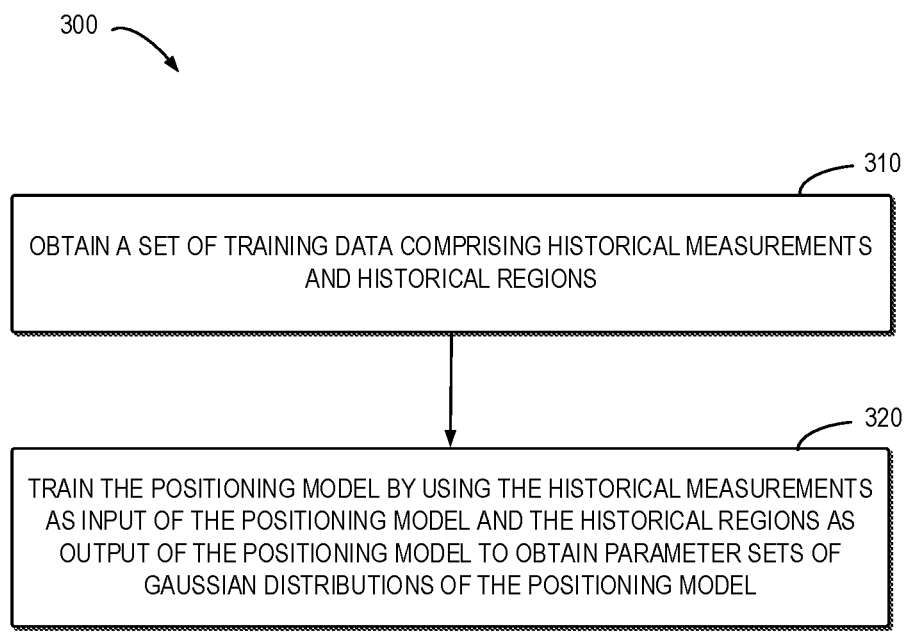
FIG. 3 illustrates a flowchart of a method of establishing a positioning model in accordance with some example embodiments of the present disclosure.

Principle and embodiments of the present disclosure will be described in detail below with reference to FIGS. 3 to 5. FIG. 3 illustrates a flowchart of a method 300 of establishing a positioning model in accordance with some example embodiments of the present disclosure. The method 300 can be implemented at the LM device 110 as shown in FIG. 1 or any other device suitable for training the DMM, for example, the positioning model 201. For the purpose of discussion, the method 300 will be described in connection with FIGS. 1 and 2.

At 310, the LM device 110 obtains a set of training data. The set of training data includes historical measurements and historical regions. The historical measurements are associated with the second device 120. The second device 120 is within one of the historical regions 11 to 48 when the historical measurement is obtained. N historical measurements from a plurality of network devices, for example, the network device 140-1 and 140-2. The set of training data may be real historical measurements collected by the network devices 140 and/or a terminal device communicated with the network devices 140. In some example embodiments, the training data may include at least one of the RSRP, the ToA of at least one signal from the network devices 140-1 and 140-2.

At 320, the LM device 110 trains the positioning model 201 by using the historical measurements as input of the positioning model 201 and the historical regions as output of the positioning model 201 to obtain parameter sets of Gaussian distributions of the positioning model. The Gaussian distributions indicates probabilities that the third device 130 is positioned in the historical regions. The parameter sets correspond to respective NLOS level of the historical regions.

In some example embodiments, the LM device 110 may determine a Gaussian distribution of a respective one of the group of historical regions 11 to 48 based on the training data and the NLOS level of the historical region. The group of historical regions 11 to 48 are served by the network device 140. In some example embodiments, the Gaussian distribution indicates a probability that the second device 120 is located in the respective historical region.

In order to determine the Gaussian distribution of the respective historical region in 320, for each pair of a historical region of the group of historical regions 11 to 48 and a network device 140, the LM device 110 may determine a respective Gaussian distribution which includes k Gaussian components. The parameter set of a Gaussian distribution for the historical region may include a number of Gaussian components comprised in the Gaussian distribution and a weight, a mean, and a variance for the Gaussian distribution.

In some example embodiments, the number k of the Gaussian components in the set and a weight, a mean and a variance for the respective Gaussian distribution may be determined based on bisection clustering algorithm, for example, EM bisection clustering algorithm. It should be understood that the EM bisection clustering algorithm is given as an illustrative example of the clustering algorithm, and implementations of the embodiments are not limited to this. Any other clustering approaches are also suitable for the implementations of the embodiments, for example, K-means algorithm.

Figure 4:
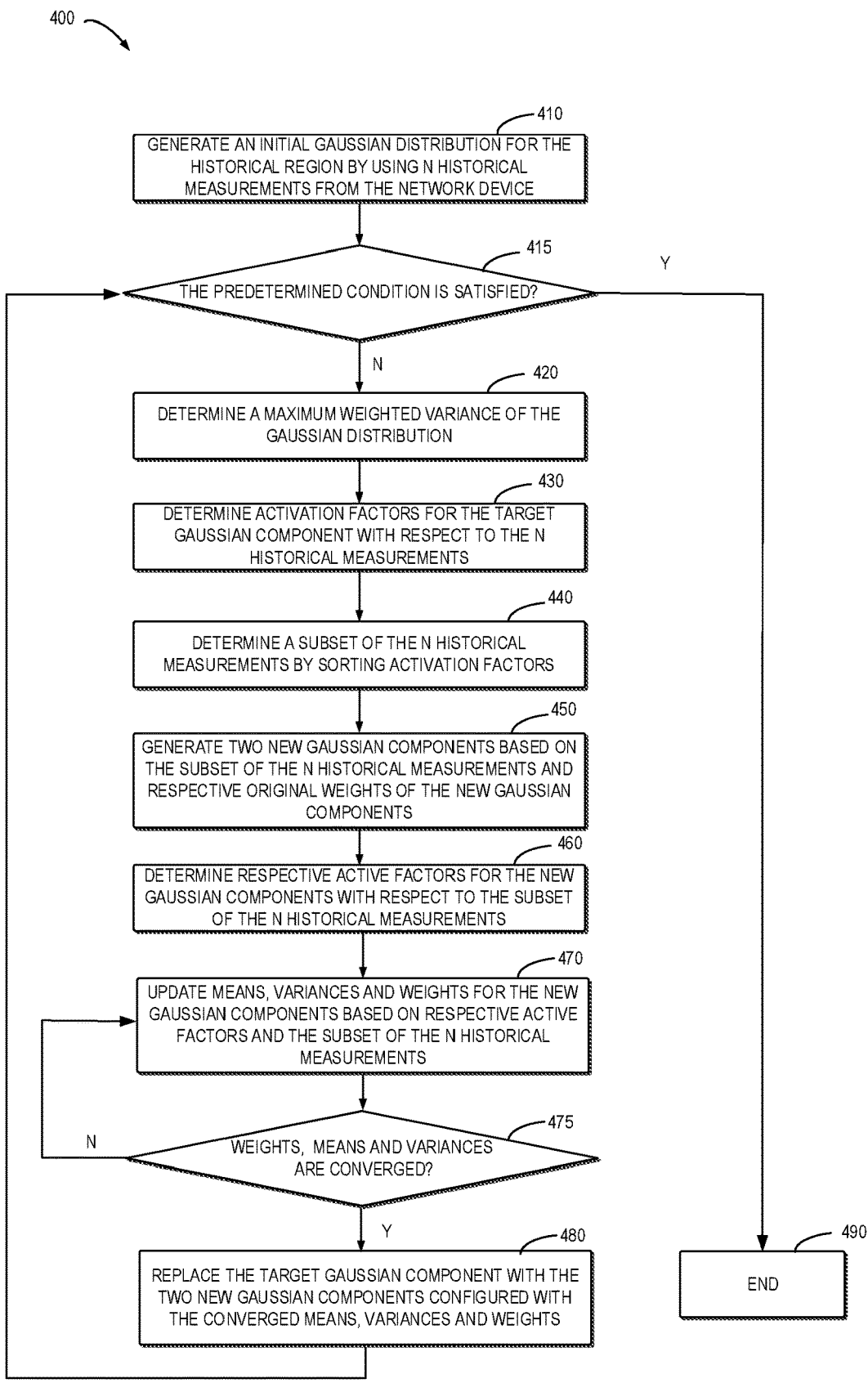
FIG. 4 illustrates a flowchart of a method for determining a Gaussian distribution of a pair of a candidate region and a network device in accordance with some example embodiments of the present disclosure.

FIG. 4 illustrates a flowchart of a method 400 for determining the Gaussian distribution $p_m(\theta_b)$ of the pair of the historical region m and the network device b in accordance with some example embodiments of the present disclosure. It is to be appreciated that the method 400 is one of various implementations of the step 320 of the method 300.

Given that the plurality of network device 140 comprises B network devices, and for a historical region m of the group of historical regions 11 to 48, the overall probability $p_m(\theta)$ that the third device 130 is positioned in the historical region m may be determined as follows:

$$p_m(\theta) = \prod_{b=1}^{B} p_m \theta_b \qquad (1)$$

where θ represents at least one measurement from the B network devices and $\theta=[\theta_1, \theta_2 \ldots \theta_B]$, $\theta_b$ represents a measurement from a network device b of the B network devices, and $p_m(\theta_b)$ represents a Gaussian distribution of a pair of the historical region m and the network device b.

For the pair of the historical region m and the network device b, the respective Gaussian distribution $p_m(\theta_b)$ may be determined as follows:

$$p_m(\theta_b) = \sum_{k=1}^{K_{b,m}} \frac{w_{k,b,m}}{\sigma_{k,b,m}\sqrt{2\pi}} \exp\left[\frac{-1}{2\sigma_{k,b,m}^2}(\theta_b - \mu_{k,b,m})^2\right] \qquad (2)$$

where $K_{b,m}$ represents a number of Gaussian components of the Gaussian distribution $p_m(\theta_b)$, and $k=1, \ldots, K_{b,m}$, $w_{k,b,m}$, $\mu_{k,b,m}$ and $\sigma_{k,b,m}$ respectively represent a weight, a mean and a variance of a Gaussian component k.

In some example embodiments, the number $K_{b,m}$, $w_{k,b,m}$, $\mu_{k,b,m}$ and $\sigma_{k,b,m}^2$ are determined by performing the expectation maximum (EM) bisection clustering algorithm at least once, until a predetermined condition is satisfied. The number $K_{b,m}$ indicates a number of clusters associated with the Gaussian distribution $p_m(\theta_b)$. According to the example embodiments, the number $K_{b,m}$ is determined adaptive to NLOS multipath reflections suffered the pair of historical region m and the network device b.

For example, if the pair severely suffers from the NLOS multipath reflections, namely, the NLOS level of this pair is high, measurements might be more widely spread, and thus the number of clusters k may be larger, in order to provide accurate probability for measurement. On another hand, a too large number of clusters k may bring an overfitting issue, because a complex model is likely to contain too much noise from the training data and it's hard to generalize. Further, a complex model may cost more resources during training and positioning phases. In order to reach a tradeoff between the positioning accuracy and the complexity of the model, an upper bound of the number of cluster k is introduced, which will be discussed below.

As shown in FIG. 4, at 410, the LM device 110 may generate an initial Gaussian distribution for the historical region m by using N historical measurements from the network device b. The initial Gaussian distribution may include a first number of Gaussian components, for example, K=1. In some example embodiments, the LM device 110 may generate the Gaussian distribution $p_m(\theta_b)$ with a set of training data, which includes N historical measurements from the network device b, where $\theta=[\theta_1, \theta_2, \theta_3 \ldots \theta_N]$ and $K_{b,m}=1$.

At 415, the LM device 110 may determine whether the predetermined condition is satisfied. In some example embodiments, the predetermined condition may include the maximum weighted variance of the Gaussian distribution $p_m(\theta_b)$ being below a variance threshold $TH_{VAR}$, while K exceeding a component threshold $TH_K$, for example, $\max\{w_1\sigma_1^2, w_2\sigma_2^2, \ldots, w_K\sigma_K^2\} < TH_{var}$ and $K > TH_K$.

If the predetermined condition is not satisfied, at 420, the LM device 110 may determine a maximum weighted variance $w_q\sigma_q^2$ of the Gaussian distribution $p_m(\theta_b)$, for example, $w_q\sigma_q^2 = \max\{w_1\sigma_1^2, w_2\sigma_2^2, \ldots, w_K\sigma_K^2\}$, where $w_q\sigma_q^2$ corresponds to a Gaussian component q of the Gaussian distribution $p_m(\theta_b)$. The Gaussian component q may impact the prediction accuracy of the positioning model and thus is determined as a target Gaussian component on which further clustering analysis is needed to be performed.

At 430, the LM device 110 may determine activation factors $\alpha_q$ for the Gaussian component q with respect to the N historical measurements as follows:

$$\alpha_{q,n} = \frac{w_q g(\theta_n | \mu_q \sigma_q^2)}{\sum_{k=1}^{K} w_k g(\theta_n | \mu_k \sigma_k^2)} \qquad (3)$$

where $n \in [1, 2, \ldots, N]$.

At 440, the LM device 110 may determine a subset of the N historical measurements $\theta' = [\theta'_1, \theta'_2, \ldots, \theta'_{N'}]$ that gives a highest a $\alpha_{q,n}$, where N' represents a number of measurements θ' in the subset of the N historical measurements. For example, the LM device 110 may sort respective activation factors $\alpha_q$ as $[\alpha_{q,1}, \alpha_{q,2} \ldots \alpha_{q,N}]$ and pick N' measurements $\theta' = [\theta'_1, \theta'_2, \ldots \theta'_{N'}]$ that gives the highest a $\alpha_{q,n}$.

The LM device 110 may then perform the bisection clustering on the measurements θ', which causes K to gain 1. For the purpose of discussion, an illustrative EM bisection clustering algorithm is given as follows. It should be understood that variants and modifications can be made to the EM bisection clustering algorithm as shown. Additionally, or alternatively, other clustering algorithms different from the EM bisection clustering algorithm are also possible for implementing the embodiments of the present disclosure. The scope of the present disclosure is not limited to this aspect.

For the Gaussian distribution $p_m(\theta_b)$, at 450, the LM device 110 may generate two new Gaussian components $g(\theta'|\mu'_1, \sigma'^2_1)$ and $g(\theta'|\mu'_2, \sigma'^2_2)$ based on the subset of the N historical measurements, that is, the measurements θ' and respective original weights of the new Gaussian components, where $w'_1, \mu'_1, \sigma'^2_1, w'_2, \mu'_2, \sigma'^2_2$ represent respective weights, means and variance of the two new Gaussian components $g(\theta'|\mu'_1, \sigma'^2_1)$ and $g(\theta'|\mu'_2, \sigma'^2_2)$ respectively.

For each of the new Gaussian components $g(\theta'|\mu'_1, \sigma'^2_1)$ and $g(\theta'|\mu'_2, \sigma'^2_2)$, at 460, the LM device 110 may determine respective active factors $\alpha_{1,n}'$ and $\alpha_{2,n}'$ with respect to the subset of the N historical measurements, that is, the measurements θ' as follows:

$$\alpha'_{k,n} = \frac{w'_k g(\theta'_n | \mu'_k, \sigma'^2_k)}{w'_1 g(\theta'_n | \mu'_1, \sigma'^2_1) + w'_2 g(\theta'_n | \mu'_2, \sigma'^2_2)} \qquad (4)$$

where k=1, 2.

At 470, the LM device 110 may then update $w'_1, \mu'_1, \sigma'^2_1, w'_2, \mu'_2, \sigma'^2_2$ based on respective active factors and the subset of the N historical measurements. For example, $w'_1, \mu'_1, \sigma'^2_1, w'_2, \mu'_2, \sigma'^2_2$ can be determined as follows:

$$\mu'_k = \frac{\sum_{n=1}^{N'} \alpha'_{k,n} \theta'_n}{\sum_{n=1}^{N'} \alpha'_{k,n}} \tag{5}$$

$$\sigma'^2_k = \frac{\sum_{n=1}^{N'} \alpha'_{k,n}(\theta'_n - \mu'_k)^2}{\sum_{n=1}^{N'} \alpha'_{k,n}} \tag{6}$$

$$w'_k = \frac{\sum_{n=1}^{N'} \alpha'_{k,n}}{N'} \tag{7}$$

where k=1, 2.

At 475, the LM device 110 may update $w'_1, \mu'_1, \sigma'^2_1, w'_2, \mu'_2, \sigma'^2_2$ in an iterative manner until $w'_1, \mu'_1, \sigma'^2_1, w'_2, \mu'_2, \sigma'^2_2$ are converged. Then, at 480, the LM device 110 may replace the Gaussian component q with $g(\theta'|\mu'_1, \sigma'^2_1)$ and $g(\theta'|\mu'_2, \sigma'^2_2)$ configured with the converged $$\frac{w_q * w'_1}{(w'_1 + w'_2)},$$

$\mu'_1, \sigma'^2_1,$ $$\frac{w_q * w'_2}{(w'_1 + w'_2)},$$

$\mu'_2, \sigma'^2_2.$

The LM device 110 may perform the method 400 interactively and thereby the variance which might impact the positioning accuracy of the positioning model can be gradually reduced until the predetermined condition is satisfied, as shown at 490. In this case, the adaptive number of clustering $K_{b,m}$ and $w_{k,b,m}, \mu_{k,b,m}$ and $\sigma^2_{k,b,m}$ can be determined and the training of the Gaussian distribution $p_m(\theta_b)$ is completed. In this way, the Gaussian distribution $p_m(\theta_b)$ is trained in consideration of the NLOS characteristic between the historical region m and the network device b.

In some example embodiments, the training of the positioning model 201 can be performed independently between the historical regions 11 to 48 and the network devices 140-1 and 140-2. In other words, the training for each pair of the historical region and the network device can proceed in parallel.

According to the example embodiments of the present disclosure, the positioning model can be trained with an adaptive number of clusters depending on how much each pair of a historical region and a network device suffers from NLOS multipath reflections. As the bisection approach is similar to a node growing process of a classic decision tree, instead of entropy, a variance multiplying weight is used as a cost indication, therefore the number of clusters, i.e., the number of the Gaussian components may be controlled by using a pruning idea about the decision tree.

Figure 5:
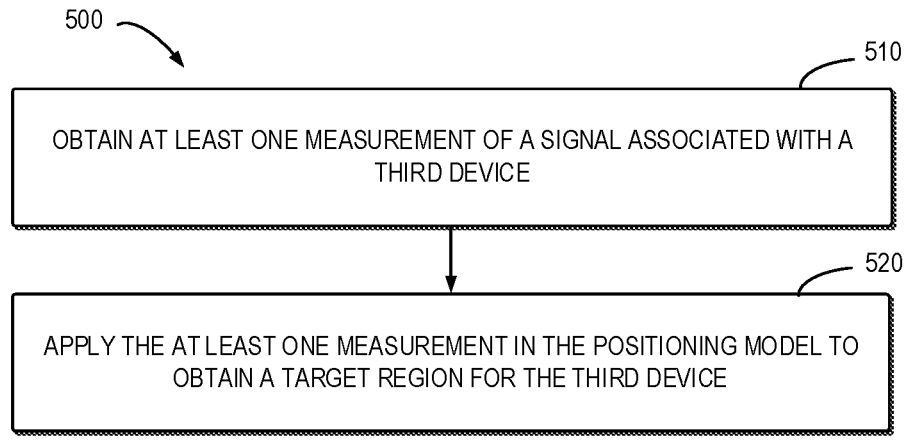
FIG. 5 illustrates a flowchart of a positioning method in accordance with some example embodiments of the present disclosure.

FIG. 5 illustrates a flowchart of a positioning method 500 in accordance with some example embodiments of the present disclosure. The method 500 can be implemented at the LM device 110 as shown in FIG. 1 or any other device configured with a positioning model trained with an adaptive number of clusters, for example, the positioning model 201. For the purpose of discussion, the method 500 will be described in connection with FIGS. 1 and 2.

As shown in FIG. 5, the LM device 110 obtains 510 at least one measurement of a signal associated with the third device 130. In some example embodiments, for example in a case where the communication network 100 is based on the LTE positioning protocol (LPP), in 510, the LM device 110 may obtain the measurement directly from the third device 130. In some other example embodiments, for example in a case where the communication network 100 is based LTE positioning protocol A (LPPA), in 510, the LM device 110 may obtain the measurement associated with the third device 130 from the network devices 140-1 and 140-2, which collects the measurement from the third device 130.

In some example embodiments, the measurements associated with the third device 130 may include the measurement of a reference signal in DL and/or UL, for example, a TDOA, an AoD, an AoA, a Multi-RTT of a reference signal and the like. The third device 130 may act as either a transmitter or a receiver of the reference signal.

At 520, the LM device 110 applies the at least one measurement in the positioning model 201 trained by using the method 300 as shown FIG. 3, so as to obtain a target region for positioning the third device 130.

For each of a group of candidate regions 11 to 48, the LM device 110 determines a probability that the third device 130 is located in a respective candidate region based on the at least one measurement and the positioning model 201.

In some example embodiments, the positioning model 201 is trained in consideration of the NLOS multipath reflections associated with the historical regions 11 to 48. The trained positioning model 201 includes a series of Gaussian distributions each corresponding to a respective one of the historical regions 11 to 48. In some example embodiments, each of the Gaussian distributions is determined based on the NLOS level of the corresponding historical region.

As previously described, the group of historical regions 11 to 48 are served by the plurality of network devices, i.e., the network devices 140-1 and 140-2. For each pair of a candidate region and a network device, a respective Gaussian distribution may be represented by k Gaussian components. The number k indicates a number of clusters of the Gaussian distribution. In the example embodiments, the number k and a weight, a mean and a variance for the respective Gaussian distribution may be determined based on Expectation Maximum bisection clustering.

Given that the plurality of network devices comprises B network devices, in the example shown in FIG. 1, the network devices are the network devices 140-1 and 140-2 and thus B=2. In some example embodiments, for a historical region in of the group of historical regions 11 to 48, the probability may be determined based on the above formula (1).

In some example embodiments, for the pair of the historical region m and the network device b, the Gaussian distribution $p_m(\theta_b)$ of this pair may be determined based on the above formula (2), with $w_{k,b,m}$, $\mu_{k,b,m}$, and $\sigma_{k,b,m}^2$ respectively representing the weight, the mean and the variance of the Gaussian component k.

In some example embodiments, the $K_{b,m}$, $w_{k,b,m}$, $\mu_{k,b,m}$ and $\sigma_{k,b,m}^2$ of the Gaussian component k may be determined by performing the following operations at least once, until a predetermined condition is satisfied. The LM device 110 may generate the $p_m(\theta_b)$ with a set of training data comprising N historical measurements from the network device b, where $\theta=[\theta_1, \theta_2, \theta_3 \ldots \theta_N]$ and $K_{b,m}=1$. The LM device 110 may determine a maximum weighted variance $w_q \sigma_q^2$ of the $p_m(\theta_b)$, where $w_q \sigma_q^2$ corresponds to a Gaussian component q of the Gaussian distribution $p_m(\theta_b)$. As discussed above, the Gaussian component q may impact the prediction accuracy of the positioning model and thus is determined as a target Gaussian component on which further clustering analysis is needed to be performed.

The LM device 110 may determine a respective activation factor $\alpha_q$ for the Gaussian component q with respect to each of the N historical measurements based on the above formula (3). The LM device 110 may determine, from the N historical measurements, a subset of measurements $\theta'$ that gives a highest $\alpha_{q,n}$, that is, $\theta'=[\theta'_1, \theta'_2, \ldots \theta'_{N'}]$, where N' represents a number of measurements in the subset of measurements $\theta'$.

The LM device 110 may perform the bisection clustering on the subset of measurements $\theta'$, causing K to gain 1. In some example embodiments, in order to perform the bisection clustering on the subset of measurements $\theta'$, the LM device 110 may generate two new Gaussian components $g(\theta'|\mu'_1, \sigma'_1^2)$ and $g(\theta'|\mu'_2, \sigma'_2^2)$ based on the subset of measurements $\theta'$, where $w'_1, \mu'_1, \sigma'_1^2, w'_2, \mu'_2, \sigma'_2^2$ represents weights, means and variance of the two new Gaussian components $g(\theta'|\mu'_1, \sigma'_1^2)$ and $g(\theta'|\mu'_2, \sigma'_2^2)$ respectively.

The LM device 110 may then determine respective active factors $\alpha_{1,n}'$ and $\alpha_{2,n}'$ for each of the subset of measurements $\theta'$ based on the above formula (4). The LM device 110 may update the parameters $w'_1, \mu'_1, \sigma'_1^2, w'_2, \mu'_2, \sigma'_2^2$ based on the above formulas (5) to (7), until $w'_1, \mu'_1, \sigma'_1^2, w'_2, \mu'_2, \sigma'_2^2$ are converged. In this case, the LM device 110 may replace the Gaussian component q with $g(\theta'|\mu'_1, \sigma'_1^2)$ and $g(\theta'|\mu'_2, \sigma'_2^2)$ with the converged $$\frac{w_q * w'_1}{(w'_1 + w'_2)},$$

$\mu'_1, \sigma'_1^2,$ $$\frac{w_q * w'_2}{(w'_1 + w'_2)},$$

$\mu'_2, \sigma'_2^2.$

In a case where the predetermined condition is satisfied, the training of the Gaussian distribution $p_m(\theta_b)$ may be completed. In some example embodiments, the predetermined condition may include the maximum weighted variance of the Gaussian distribution $p_m(\theta_b)$ being below a variance threshold $TH_{VAR}$, while K exceeding a component threshold $TH_K$, for example, $\max\{w_1\sigma_1^2, w_2\sigma_2^2, \ldots, w_K\sigma_K^2\} < TH_{var}$ and $K > TH_K$.

The LM device 110 determines, from the group of candidate regions 11 to 48, a target region with a highest probability. By way of example, the LM device 110 may determine the candidate region 23 having a highest probability among the group of the candidate regions 11 to 48, and thus the candidate region 23 is determined to be the target region. In this case, the LM device 110 may position the third device 130 within the target region 23.

The LM device 110 determines a reference location of the target region to be the location of the third device 130. For example, the centroid position of the target region may be selected as the reference location. Alternatively, other reference positions within the target region may also be selected as the reference location. The scope of the present disclosure is not limited to this aspect.

With the solution for fingerprint positioning provided in the example embodiments of the present application, the location management device in the core network or the RAN can determine a location of a terminal device based on a GMM based bisection clustering approach. Comparing with the legacy fingerprint positioning technology, the solution proposed herein takes the NLOS characteristics between each of bins and base station into consideration, and trains the positioning model based on respective NLOS levels within each of the bins. As such, the positioning accuracy of the fingerprint positioning technology can be significantly improved, while the cost and complexity of the proposed positioning solution are acceptable.

In some example embodiments, a first apparatus capable of performing the method 300 may comprise means for performing the respective steps of the method 300. The means may be implemented in any suitable form. For example, the means may be implemented in a circuitry or software module.

In some example embodiments, the firs apparatus comprises: means for obtaining a set of training data comprising historical measurements and historical regions, a historical measurement being associated with a second apparatus, the second apparatus being within one of the historical regions when the historical measurement is obtained; and means for training the positioning model by using the historical measurements as input of the positioning model and the historical regions as output of the positioning model to obtain parameter sets of Gaussian distributions of the positioning model, the Gaussian distributions indicating probabilities that a third apparatus is positioned in the historical regions, and the parameter sets corresponding to respective non-light of sight levels of the historical regions.

In some example embodiments, wherein one of the historical measurements comprises at least one of a reference signal received power or a time of arrival of a reference signal associated with the second apparatus, and one of the historical regions is indicated by at least one of a ground truth or an region index of the historical region.

In some example embodiments, the means for training the positioning model comprises: for one of network devices and a historical region capable of receiving a reference signal from the respective network device, means for determining a parameter set of a Gaussian distribution for the historical region, the parameter set comprising a number of Gaussian components comprised in the Gaussian distribution and a weight, a mean, and a variance for the Gaussian distribution.

In some example embodiments, the means for determining the parameter set comprises: means for generating an initial Gaussian distribution for the historical region by using N historical measurements from the network device, the initial Gaussian distribution comprising a first number of Gaussian components; and means for performing the following operations at least once, until a predetermined condition is satisfied: determining a maximum weighted variance of the Gaussian distribution, the maximum weighted variance corresponding to a target Gaussian component of the Gaussian distribution; determining activation factors for the target Gaussian component with respect to the N historical measurements; determining a subset of the N historical measurements by sorting activation factors, the subset of the N historical measurements generating a highest activation factor; and performing the bisection clustering on the subset of the N historical measurements, causing a value of the first number to increase 1.

In some example embodiments, the means for performing the bisection clustering on the subset of the N historical measurements comprises: means for generating two new Gaussian components based on the subset of the N historical measurements and respective original weights of the new Gaussian components; means for determining respective active factors for the new Gaussian components with respect to the subset of the N historical measurements; means for updating means, variances and weights for the new Gaussian components based on respective active factors and the subset of the N historical measurements, until means, variances and weights are converged; and means for replacing the target Gaussian component with the two new Gaussian components configured with the converged means, variances and weights.

In some example embodiments, the predetermined condition comprises the maximum weighted variance of the Gaussian distribution being below a threshold variance, while the number of the Gaussian components exceeding a threshold of a component number.

In some example embodiments, wherein at least one of the historical measurements is obtained from at least one of the second apparatus or a network device communicated with the second apparatus.

In some example embodiments, the first apparatus comprises a location management device, the second apparatus comprises a terminal device, and the third apparatus comprises a further terminal device.

In some example embodiments, a fourth apparatus capable of performing the method 500 may comprise means for performing the respective steps of the method 500. The means may be implemented in any suitable form. For example, the means may be implemented in a circuitry or software module.

In some example embodiments, the fourth apparatus comprises: means for obtaining at least one measurement of a signal associated with a third apparatus; and means for applying the at least one measurement in the positioning model according to the method 300 to obtain a target region for positioning the third apparatus.

In some example embodiments, the at least one measurement is obtained from at least one of the third apparatus or a network device communicated with the third apparatus.

In some example embodiments, the third apparatus comprises a terminal device and the fourth apparatus comprises a location management device.

Figure 6:
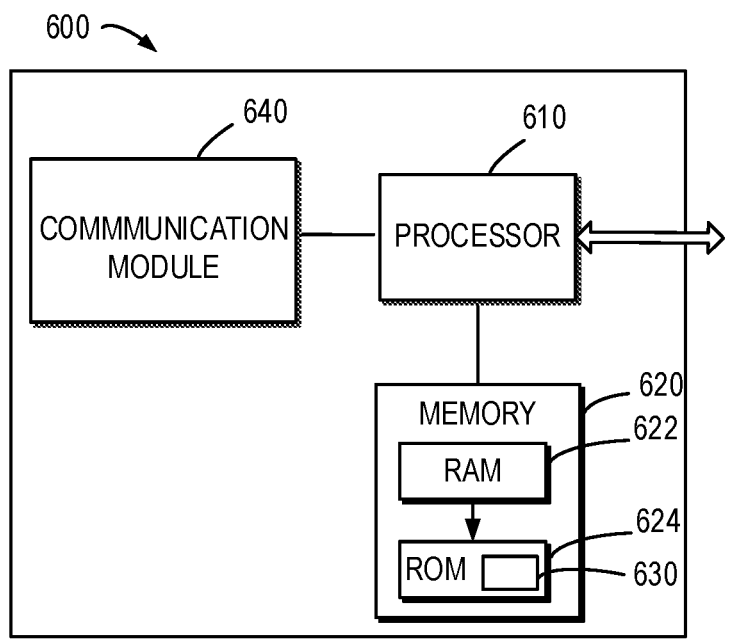
FIG. 6 illustrates a simplified block diagram of an apparatus that is suitable for implementing embodiments of the present disclosure.

FIG. 6 is a simplified block diagram of a device 600 that is suitable for implementing embodiments of the present disclosure. The device 600 may be provided to implement the communication device, for example the LM device 110, the second device 120, the network device 140, as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 620. The processor 610 may perform any suitable actions and processing by loading the program 630 into the RAM 620.

The embodiments of the present disclosure may be implemented by means of the program 630 so that the device 600 may perform any process of the disclosure as discussed with reference to FIGS. 3 to 5. The embodiments of the present disclosure may also be implemented by hardware or by a combination of software and hardware.

Figure 7:
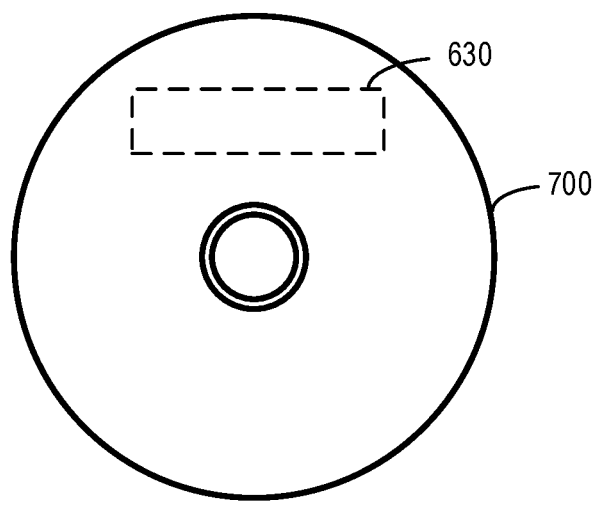
FIG. 7 illustrates a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 500 as described above with reference to FIGS. 3 and 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for establishing a positioning model, comprising:
   obtaining, at a first device, a set of training data comprising historical measurements and historical regions, a historical measurement being associated with a second device, the second device being within one of the historical regions when the historical measurement is obtained; and
   training the positioning model by using the historical measurements as input of the positioning model and the historical regions as output of the positioning model to obtain parameter sets of Gaussian distributions of the positioning model, the Gaussian distributions indicating probabilities that a third device is positioned in the historical regions, and the parameter sets corresponding to respective non-light of sight levels of the historical regions.

2. The method of claim 1, wherein one of the historical measurements comprises at least one of a reference signal received power or a time of arrival of a reference signal associated with the second device, and one of the historical regions is indicated by at least one of a ground truth or an region index of the historical region.

3. The method of claim 2, wherein training the positioning model comprises:
   for one of network devices and a historical region capable of receiving a reference signal from the respective network device, determining a parameter set of a Gaussian distribution for the historical region, the parameter set comprising:
      a number of Gaussian components comprised in the Gaussian distribution, and
      a weight, a mean, and a variance for the Gaussian distribution.

4. The method of claim 3, wherein determining the parameter set comprises:
   generating an initial Gaussian distribution for the historical region by using N historical measurements from the network device, the initial Gaussian distribution comprising a first number of Gaussian components; and
   performing the following operations at least once, until a predetermined condition is satisfied:
      determining a maximum weighted variance of the Gaussian distribution, the maximum weighted variance corresponding to a target Gaussian component of the Gaussian distribution;
      determining activation factors for the target Gaussian component with respect to the N historical measurements;
      determining a subset of the N historical measurements by sorting activation factors, the subset of the N historical measurements generating a highest activation factor; and
      performing the bisection clustering on the subset of the N historical measurements, causing a value of the first number to increase 1.

5. The method of claim 4, wherein performing the bisection clustering on the subset of the N historical measurements comprises:
   generating two new Gaussian components based on the subset of the N historical measurements and respective original weights of the new Gaussian components;
   determining respective active factors for the new Gaussian components with respect to the subset of the N historical measurements;

updating means, variances and weights for the new Gaussian components based on respective active factors and the subset of the N historical measurements, until means, variances and weights are converged; and replacing the target Gaussian component with the two new Gaussian components configured with the converged means, variances and weights.

6. The method of claim 4, wherein the predetermined condition comprises the maximum weighted variance of the Gaussian distribution being below a threshold variance, while the number of the Gaussian components exceeding a threshold of a component number.

7. The method of claim 1, wherein at least one of the historical measurements is obtained from at least one of the second device or a network device communicated with the second device.

8. The method of claim 1, wherein the first device comprises a location management device, the second device comprises a terminal device, and the third device comprises a further terminal device.

9. A positioning method comprising:
obtaining, at a fourth device, at least one measurement of a signal associated with a third device; and
applying the at least one measurement in the positioning model according to claim 1 to obtain a target region for positioning the third device.

10. The positioning method of claim 9, wherein the at least one measurement is obtained from at least one of the third device or a network device communicated with the third device.

11. The positioning method of claim 9, wherein the third device comprises a terminal device and the fourth device comprises a location management device.

12. A non-transitory computer readable medium comprising program instructions for causing an apparatus to perform the method according to claim 9.

13. A fourth device comprising:
at least one processor; and
at least one memory including computer program code,
the at least one memory and the computer program code configured to, with the at least one processor, cause the fourth device to:
obtaining at least one measurement of a signal associated with a third device; and
applying the at least one measurement in the positioning model according to claim 1 to obtain a target region for positioning the third device.

14. A non-transitory computer readable medium comprising program instructions for causing an apparatus to perform the method according to claim 1.

15. A first device comprising:
at least one processor; and
at least one memory including computer program code,
the at least one memory and the computer program code configured to, with the at least one processor, cause the first device to:
obtain a set of training data comprising historical measurements and historical regions, a historical measurement being associated with a second device, the second device being within one of the historical regions when the historical measurement is obtained; and
train the positioning model by using the historical measurements as input of the positioning model and the historical regions as output of the positioning model to obtain parameter sets of Gaussian distributions of the positioning model, the Gaussian distributions indicating probabilities that a third device is positioned in the historical regions, and the parameter sets corresponding to respective non-light of sight levels of the historical regions.

16. The first device of claim 15, wherein one of the historical measurements comprises at least one of a reference signal received power or a time of arrival of a reference signal associated with the second device, and one of the historical regions is indicated by at least one of a ground truth or an region index of the historical region.

17. The first device of claim 16, wherein the first device is caused to train the positioning model by:
for one of network devices and a historical region capable of receiving a reference signal from the respective network device, determining a parameter set of a Gaussian distribution for the historical region, the parameter set comprising:
a number of Gaussian components comprised in the Gaussian distribution, and
a weight, a mean, and a variance for the Gaussian distribution.

18. The first device of claim 17, wherein the first device is caused to determine the parameter set by:
generating an initial Gaussian distribution for the historical region by using N historical measurements from the network device, the initial Gaussian distribution comprising a first number of Gaussian components; and
performing the following operations at least once, until a predetermined condition is satisfied:
determining a maximum weighted variance of the Gaussian distribution, the maximum weighted variance corresponding to a target Gaussian component of the Gaussian distribution;
determining activation factors for the target Gaussian component with respect to the N historical measurements;
determining a subset of the N historical measurements by sorting activation factors, the subset of the N historical measurements generating a highest activation factor; and
performing the bisection clustering on the subset of the N historical measurements, causing a value of the first number to increase 1.

19. The first device of claim 18, wherein the first device is caused to perform the bisection clustering on the subset of the N historical measurements by:
generating two new Gaussian components based on the subset of the N historical measurements and respective original weights of the new Gaussian components;
determining respective active factors for the new Gaussian components with respect to the subset of the N historical measurements;
updating means, variances and weights for the new Gaussian components based on respective active factors and the subset of the N historical measurements, until means, variances and weights are converged; and
replacing the target Gaussian component with the two new Gaussian components configured with the converged means, variances and weights.

20. The first device of claim 18, wherein the predetermined condition comprises the maximum weighted variance of the Gaussian distribution being below a threshold variance, while the number of the Gaussian components exceeding a threshold of a component number.

21. The first device of claim 15, wherein at least one of the historical measurements is obtained from at least one of the second device or a network device communicated with the second device.

22. The first device of claim 15, wherein the first device comprises a location management device, the second device comprises a terminal device, and the third device comprises a further terminal device.

\* \* \* \* \*